US008464246B2

(12) United States Patent
Davies et al.

(10) Patent No.: US 8,464,246 B2
(45) Date of Patent: Jun. 11, 2013

(54) AUTOMATION OF MAINFRAME SOFTWARE DEPLOYMENT

(75) Inventors: David Davies, Felton, CA (US); Ralph Crosby, Austin, TX (US)

(73) Assignee: BMC Software, Inc., Houston, TX (US)

( * ) Notice: Subject to any disclaimer, the term of this patent is extended or adjusted under 35 U.S.C. 154(b) by 887 days.

(21) Appl. No.: 12/614,307

(22) Filed: Nov. 6, 2009

(65) Prior Publication Data

US 2010/0162227 A1 Jun. 24, 2010

Related U.S. Application Data

(60) Provisional application No. 61/140,690, filed on Dec. 24, 2008.

(51) Int. Cl.
*G06F 9/445* (2006.01)
(52) U.S. Cl.
USPC ............................................. 717/174
(58) Field of Classification Search
USPC ............................................. 717/174
See application file for complete search history.

(56) References Cited

U.S. PATENT DOCUMENTS

| 7,234,118 | B1 | 6/2007 | Bleizeffer et al. | |
|---|---|---|---|---|
| 7,503,041 | B2* | 3/2009 | Butterweck et al. | 717/168 |
| 7,823,148 | B2* | 10/2010 | Deshpande et al. | 717/174 |
| 2001/0011305 | A1* | 8/2001 | Barker | 709/237 |
| 2002/0013939 | A1 | 1/2002 | Daynes et al. | |
| 2002/0091723 | A1 | 7/2002 | Traner et al. | |
| 2005/0066324 | A1* | 3/2005 | Delgado et al. | 717/170 |
| 2005/0257214 | A1 | 11/2005 | Moshir et al. | |
| 2008/0163192 | A1* | 7/2008 | Jha et al. | 717/173 |

OTHER PUBLICATIONS

IBM, "Smp/E Users Guide", Mar 2001, First Edition.*

* cited by examiner

*Primary Examiner* — Wei Zhen
*Assistant Examiner* — Lanny Ung

(57) ABSTRACT

Methods and systems to automate the deployment from one SMP/E installed run-time mainframe system logical partition (LPAR) to one or more different and distinct LPARs within a mainframe environment are described. Deployment may consist of distributing one or more installation items (e.g., complete products, product upgrades, patches and/or temporary fixes) from one installation environment to another target system. Also, the installed items may have optionally undergone further configuration after the initial installation and prior to actual automated deployment. Each of the target systems are communicatively coupled to the first (i.e., source) LPAR.

20 Claims, 9 Drawing Sheets

AUTOMATION OF MAINFRAME SOFTWARE DEPLOYMENT

CROSS REFERENCE TO RELATED APPLICATIONS

This Application claims priority to U.S. Provisional Application Ser. No. 61/140,690 entitled "AUTOMATION OF MAINFRAME SOFTWARE DEPLOYMENT" filed 24 Dec. 2008 and which is incorporated by reference in its entirety herein.

BACKGROUND

This disclosure relates generally to the field of distributed mainframe software management. More particularly, but not by way of limitation, this disclosure refers to a method of installing a first copy of a product at a run-time location, optionally configuring that product, and automating the deployment of that product to another run-time location.

System Modification Program/Extend (SMP/E) is a shared utility used in conjunction with the z/OS operating system provided by International Business Machines Corporation (IBM) of Armonk N.Y. (z/OS is a registered trademark of the International Business Machines corporation.) SMP/E is a common installation tool for managing operating system components and middleware on z/OS. SMP/E may be used to manage multiple software versions, apply patches and updates, facilitate orderly testing and (if necessary) reversion to a previous state, allow a "trial run" pseudo-installation to verify that actual installation will work, keep audit and security records to assure only approved software updates occur, and otherwise provide centralized control over software installation on z/OS.

Although it is possible to design and ship software products that install on z/OS without SMP/E, most mainframe administrators prefer SMP/E-enabled products, at least for non-trivial packages. Using SMP/E typically requires some working knowledge of Job Control Language (JCL), although most products supply sample JCL. The rigorous software management discipline associated with SMP/E typically extends to product documentation as well, with IBM and other vendors supplying a standardized "Program Directory" manual for each software product that precisely aligns with the SMP/E work processes. The Program Directory provides detailed information on pre-requisites and co-requisites, for example.

Typically an IT department using SMP/E would install a product in one location once and maintain the level of the contents in that location. Also, companies sometimes do not execute products from the install set of libraries. Instead, it is common for a system administrator to manually copy the full set of run-time libraries to several locations (sometimes hundreds) via simple copy utilities and allow respective products to execute from those locations. Licensing of products is handled separately from the actual location of a product's installed run-time libraries. At the location where the products are executed the copied libraries are no longer maintained via SMP/E.

In light of these and other operational shortcomings of SMP/E, there is a need for a method and system to provide a simplified means for customers to not only maintain an inventory of the installed software products but provide a graphical method for deploying products, new releases and product maintenance. Therefore, problems and issues related to management and movement of product files may be reduced via a common visualization of the status of the software in the environment and an integrated set of management technologies.

SUMMARY

In one embodiment a system and method for deploying mainframe products and/or product updates is disclosed. First, a communications and a management infrastructure are established on a plurality of LPARs within a mainframe computing environment. The infrastructure includes a Coordinating Address Space (CAS) to facilitate communication between LPARs and a Deployment Address Space (DAS) to manage product inventory and distribution. After the infrastructure is in place a user (e.g., a system admin or "Sysprog") may connect via a web browser to a master station (e.g., master LPAR); view/select products installed on the master system; select one or more target systems (target LPARs) and automatically deploy the selected products and/or product updates to the selected target systems.

In another embodiment a computer readable medium has instructions tangibly embodied thereon to cause a programmable control device to perform a method of deploying mainframe products within a mainframe computing environment utilizing a CAS and a DAS.

DETAILED DESCRIPTION

Figure 1:
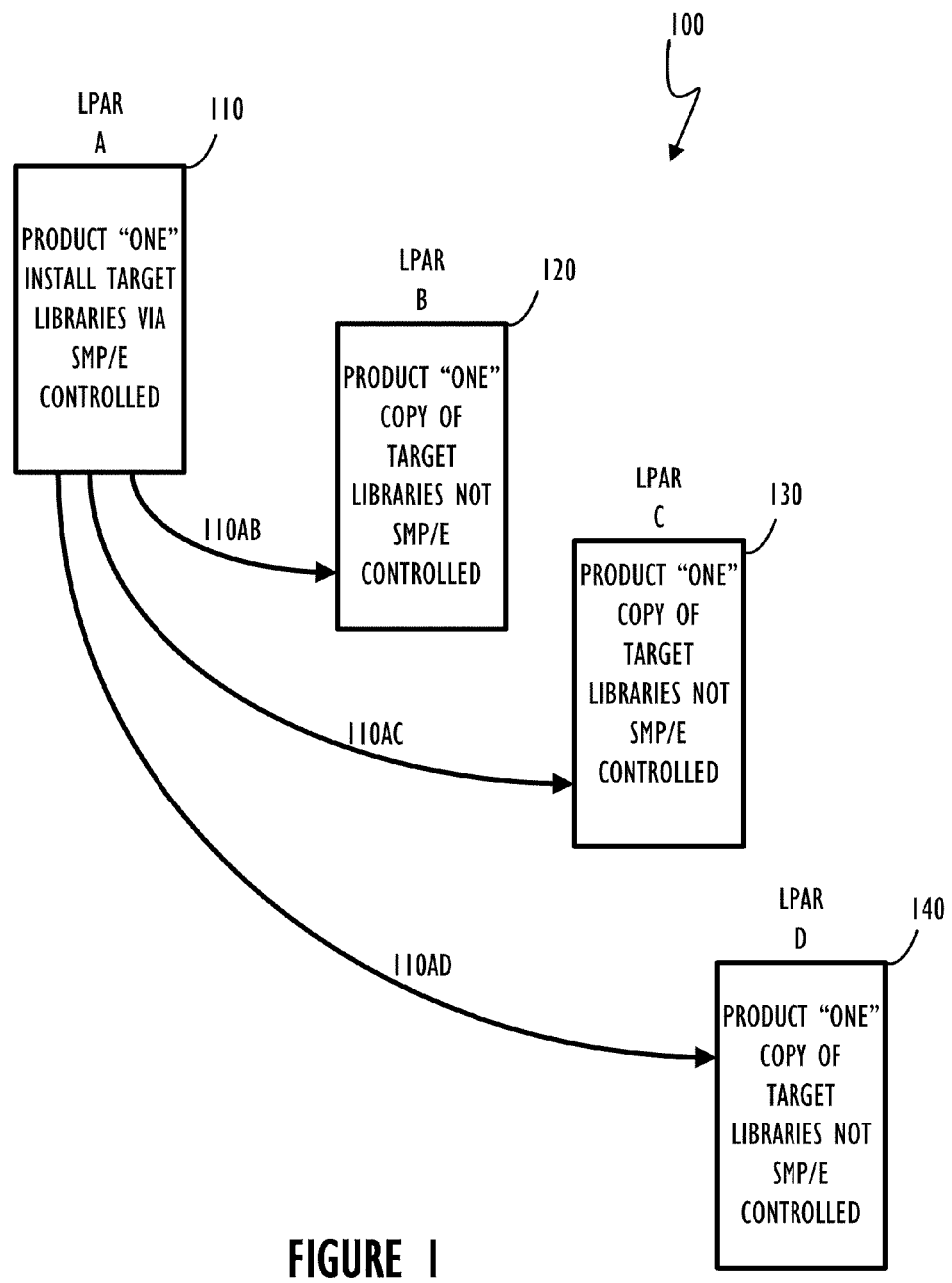
FIG. 1 shows, in block diagram form, a prior art example of products installed without an automated deployment process.

Methods and systems to automate the deployment from one SMP/E installed run-time mainframe system to one or more distinct Logical Partitions (LPARs) in a mainframe environment are described. Deployment, as described further below, may consist of distributing one or more installation items (e.g., complete products, product upgrades, patches and/or temporary fixes) from one target environment to another. Also, the installed items may have optionally undergone further configuration after the initial installation and prior to actual deployment.

To aid in the understanding of this disclosure the following information about acronyms associated with SMP/E is provided. An APAR (authorized program analysis report) is a term used to denote a description of a problem with a program that is formally tracked until a solution is provided. An APAR is created or "opened" after a customer (or sometimes IBM itself) discovers a problem that IBM determines is due to a bug in IBM's program/application code. The APAR is given a unique number for tracking and a target date for solution. When the support group that maintains the code solves the problem, it develops a program temporary fix (PTF) that, when applied, possibly with a SuperZap, will temporarily solve the problem for the customers that may be affected. The PTF will "close" the APAR. PTFs can be applied individually but are usually made available as part of a fix package that includes a number of PTFs. Meanwhile, the PTFs are provided to the development group that is working on the next product release. These developers may or may not use the PTFs (since these are temporary fixes), but will determine and design a correct problem solution to incorporate in the next product release.

A system modification (SYSMOD) is a collection of software elements that can be individually distributed and installed. The SYSMOD is the input data to SMP/E that defines the introduction, replacement, or update of product function elements for SMP/E processing into target libraries and associated distribution libraries. A modification control statement (MCS) is an SMP/E control statement used to package a SYSMOD. These MCS statements describe the elements of a program and the relationships that program has with other programs that may be installed on the same system.

Relative file format (Relfile) is a SYSMOD packaging method in which elements and JCLIN data are in separate relative files from the MCSs. When SYSMODs are packaged in relative file format, there is a file of MCSs for one or more SYSMODs, and one or more relative files containing unloaded source-code data sets and unloaded link-edited data sets containing executable modules. Relative file format is the typical method used for packaging function SYSMODs. JCLIN may be defined as any of the following:

The SMP/E process of creating or updating the target zone using JCLIN input data.

The data set that contains the Stage 1 output from a system, subsystem or product generation, used by SMP/E to update or create the target zone.

The SMP/E JCLIN command used to read in the JCLIN data.

The ++JCLIN Statement in a SYSMOD that enables SMP/E to perform the target zone updates during APPLY processing.

JCLIN data refers to the job control language (JCL) statements associated with the ++JCLIN statement or saved in the SMPJCLIN data set. JCLIN data is used by SMP/E to update the target zone when the SYSMOD is applied. Optionally, JCLIN data can be used by SMP/E to update the distribution zone when the SYSMOD is accepted.

A single physical mainframe computer may be subdivided into multiple Logical Partitions (LPARs). A LPAR is a logical segmentation of a mainframe's memory and other resources that allows it to run its own copy of an operating system and associated applications. LPAR's may be enabled via special hardware circuits or purely through software. LPAR's may also allow multiple system images (of the same operating system or different operating systems) to run in one machine. Furthermore, each LPAR can execute one or more subsystems within an operating system. A subsystem is a service provider that performs one or more functions, but does nothing until it is requested. Examples of mainframe subsystems include Customer Information Control System (CICS), Information Management System (IMS), Resource Access Control Facility When configuring or providing run-time copies of software in a mainframe environment, the system or location where actions occur may affect the availability and validity of both information and resources. In one example, a shared direct access storage device (DASD) may make product libraries accessible from multiple systems while in other examples system values and applications are location dependent. For example, a product installed on a small test LPAR but intended for execution on a larger production system cannot rely on system resource values and installed products (e.g. DBMS) discovered during the installation process on the test LPAR. Additional actions and configuration may be required when relocated (deployed) or executed on the ultimate destination system.

Similarly, the person or "role" performing the operation may differ. A system programmer ("Sysprog") (e.g., system administrator) may perform initial installation on a preferred system while a database administrator (DBA) may subsequently configure the product after installation. The configuration performed by the DBA may be on the same initial system or a different system. Further, the DBA may perform multiple configurations on multiple separate execution systems. For the purpose of distinguishing between where the installation process occurs and the location(s) where execution occurs, the following definitions are provided:

Initial System:
system or LPAR on which the product is initially installed regardless of the destination or target system(s) where it will execute.

Target System:
system or LPAR on which the product will execute, which may be the same as the installation system. There may be multiple target systems for any instance of a product installation because an installed and configured product may be replicated to other targets. A target system is therefore an expected execution environment for the installed product.

Multiple distinct activities may be required to introduce a product to a new environment, prepare it for initial execution, move it around the customer environment, and tune it for specific needs. These processes can be separately described and should be independently executable. In prior art installation methods, these processes may be intermingled and deployment is thereby constrained. To accomplish automated deployment it may be desirable to separate these processes to the extent that they can occur when and where they are needed. The following explanations and definitions outline some of these multiple distinct activities:

Installation:
a process resulting in the creation and population of a product's SMP/E environment. The product is essentially "laid down" and ready to configure/customize. At the end of installation the product files and elements are present and only those actions needed to ensure their validity have been taken. Installation is separate from and always precedes configuration and deployment.

Configuration:
process by which a product's execution requirements are met and the product is tailored for a target environment. Configuration is normally expected to be user-driven and consists of distinct phases; (e.g., Dialog (data acquisition), Generation (preparation for execution), and Execution).

Dialog:
user interaction that determines the choices and options to be used. It normally occurs on the run-time libraries on the initial system although it may occur on target systems. Real-time discovery during the dialog requires target system execution. A target system dialog requirement normally inhibits automated deployment.

Generation:

output phase in which the results of the dialog are used to create or tailor the JCL and product elements that will actually perform product configuration. It may occur under the aegis of the dialog as one of the final steps. It normally occurs on the initial system.

Execution:

phase in which the generated JCL or actions are executed to configure or enable the product to function. It is always performed on a target system. Products with simple configuration may have it performed once and the result used on multiple systems.

Customization:

any further persistent tailoring of product operation or options for user- or site-specific needs. In the context of this disclosure, configuration and customization will be considered synonymous and the term configuration will be used for both initial and subsequent product tailoring.

Deployment:

requirements and methods by which an installed product is prepared for, transported to, and configured to execute on a destination system. Three potential levels of support (manual, assisted and managed) reflect the automation or complexity needed for each.

Manual Deployment:

a process which provides the customer with information to use in their own deployment activities. It identifies to the customer the product elements and/or libraries to be transported to the target system and the configuration JCL and/or actions to be executed. The customer will transport the product files and execute the configuration JCL on the target system.

Assisted Deployment:

providing additional facilities to simplify the transport and execution of product files and configuration. Examples include pre-packaging (e.g. GIMZIP), transport (e.g. FTP), execution- and reporting (i.e. facilitate job submission and results evaluation). Assisted deployment simplifies the manual process yet assumes only basic services are available.

Managed Deployment:

imposes intelligence in the process by performing and controlling the distribution and execution of the product files and configuration execution. This requires the presence of certain facilities and potentially vendor supplied products.

Cloning:

a form of deployment whereby an already-configured product environment is duplicated or relocated (to the same or another target system) with the already applied configuration changes. Although the actual process steps may differ slightly from deployment+configuration the methodology of identifying and packaging is the same as Manual or Assisted deployment. The term deployment will be used unless specifically referencing an activity only associated with cloning.

Post Deployment Change:

process of changing a fully operational product. The nature of these changes depends on how the product operates. Changes may be the editing of parameter files that take effect the next time the product executes. For an online product with a user interface, the changes may (should) be part of the user interface. It should be possible to have the changes take effect without restarting an online product.

Post Deployment Change Deployment:

process of moving a post installation change out to all or a subset of the instances of the product in the enterprise. The deployment of these changes will be manual, assisted or managed.

Deployable Product:

a product that has reduced or eliminated impediments to deployment such as manual operations or pre-execution requirements. A deployable product has little or no setup requirement, has externalized configuration to make it simple to invoke during deployment, or performs needed configuration at execution. For example a deployable product may employ standalone modules that perform required configuration when executed either during product initiation or externally by a process during deployment.

Packaging:

identifying those elements to be included, and combining them into a transportable unit. It is desirable for the dialog that generated the configuration JCL to identify the execution and related libraries to be included. These SMP/E and non-SMP/E data sets comprise the entire execution requirement for the product. The concept of a transportable unit has many variations. At its simplest is the identification of those elements to be transported, allowing the user to determine the method. There are several different technologies capable of creating a transportable unit, each with their own benefits and shortcomings. The potential to use techniques such as GIMZIP, TERSE, XMIT, or other packaging that accommodates various file formats may require special consideration.

Transport Alternatives:

Movement of the identified files or bundle has both technical solutions and customer restrictions. The ability to relocate the elements depends on accessibility such as shared DASD, connectivity such as FTP or other transport mechanism, or media such as tape or other portable storage. The method selected by a given customer will depend upon their requirements, environment, and the preferred method of distribution.

Disclosed are a system, method and process for managing product installation, configuration, deployment, and maintenance processes. One of ordinary skill in the art, given the benefit of this disclosure, will understand that the methods and systems described herein reduce time to deploy products, product upgrades, temporary fixes and product maintenance in a mainframe environment. It may also be possible to reduce customer resources required, reduce complexity of installation, reduce potential for errors by programmatically controlling steps, improve (control, tracking and visibility), and enable selective maintenance capabilities.

As explained above, deployment may consist of automatically copying the contents of SMP/e target libraries where a product was installed, to another set of libraries in another location in the mainframe enterprise (one or more mainframes making up a mainframe environment of Sysplexes and LPARs). To facilitate this operation persistent simple subsystems may be used. For example, a Coordinating Address Space (CAS) is provided to facilitate the communication between multiple CAS instances in the mainframe environment. A CAS instance may exist on each LPAR within the Sysplex or Sysplexes. The Deployment Manager Address Space (DAS) houses and drives all the functionality to accommodate the required configuration and managed deployment automatically. Inventory information on software and maintenance installed in a particular LPAR may be maintained by the instance of the persistent simple subsystem in the same LPAR. A graphical user interface to the persistent simple subsystem may be provided allowing a user (e.g., Sysprog) the capability to import products, new releases of products, maintenance, and patches into one or more of the multiple mainframe environments. This graphical user interface may also allow the user to better "visualize" the status of software throughout the entire mainframe environment.

Product specific configuration information requirements may be encapsulated within the package received from the vendor. This information may also be used to automatically control dialogs within the graphical interface and allow deployment and configuration of products into appropriate environments. Maintenance to this encapsulated information may also control further automatic configuration of products where appropriate. The infrastructure used may also have the capability of causing actions (configuration changes) to be controlled or initiated at any LPAR within the mainframe enterprise environment from another communicatively coupled LPAR.

Referring now to FIG. 1, a block diagram 100 is shown describing an example of a product (e.g., named product "ONE") installed via prior art manual deployment process. Block 110 represents a mainframe instance controlled via SMP/E. As described above, a system administrator may install a product into a first LPAR 110 and then simply copy the installed libraries to additional LPAR's 120, 130 and 140 as needed. This is done mainly for convenience because copying an already installed application may be easier than executing SMP/E multiple times on multiple LPAR's. Also, the overhead of executing SMP/E to perform each installation may introduce more overhead for the system administrator as the number of LPAR's increases beyond the simplified four (4) LPAR's of this example. It is not uncommon for a single organization to have dozens or even hundreds of LPAR's to manage so the overhead of running SMP/E for each LPAR may become overwhelming.

In FIG. 1 (prior art), the act of copying from LPAR A (110) to LPAR B (120) is represented by arrow 110AB. Arrows 110AC and 110AD similarly represent the act of copying to LPAR C 130 and LPAR D 140 respectively. Because these different acts of copying may happen at different times, it is possible for each LPAR's installation image to be inconsistent with the other LPAR's. This will happen if the system administrator utilizes SMP/E to install a patch (e.g., PTF) to LPAR A (110) and only copies the updated product install libraries as indicated by 110AB to LPAR B (120). At this point in time LPAR A 110 and LPAR B 120 will be consistent with each other but will be different from LPAR C 130 and LPAR D 140. Over time it is possible for each of the systems to be out of sync with each other and the system administrator may lose knowledge of what versions of product libraries are on LPAR's B, C and D (120, 130 and 140) because these product libraries were simply copied, are not SMP/E controlled, and are note centrally administered.

Figure 2A:
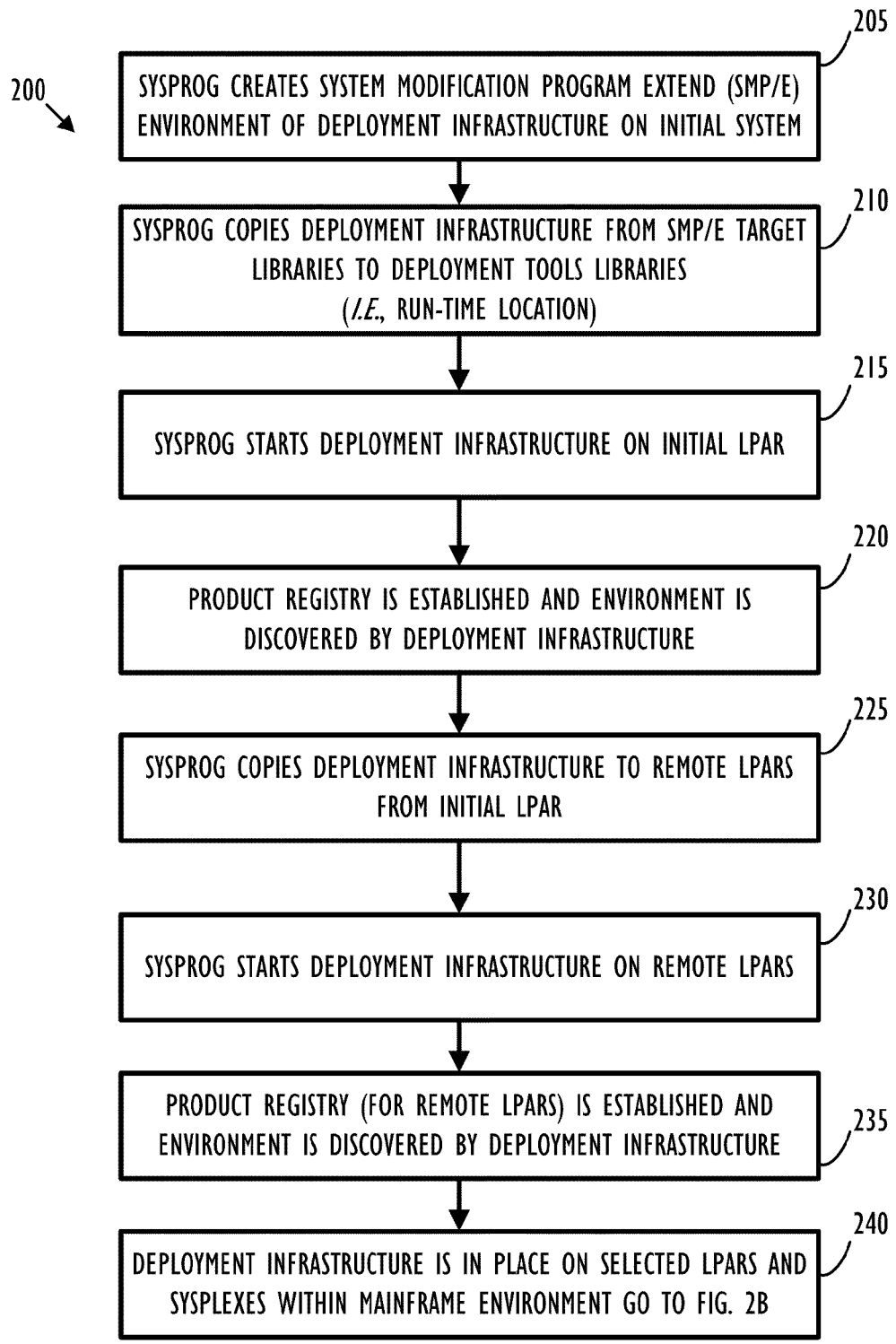
FIG. 2 shows, in flow chart form, an example workflow of an initial system deployment setup step according to one embodiment.

Referring now to FIG. 2, a process flow 200 for setting up a mainframe environment configured for product deployment according to one embodiment is shown. Process 200 begins at block 205 where a Sysprog installs a deployment infrastructure via SMP/E into an initial system. Next, at block 210, the Sysprog copies the deployment infrastructure from the SMP/E target libraries to a deployment tools library where it may execute. At block 215 the Sysprog may start the deployment infrastructure on the initial LPAR. One initial function of the deployment infrastructure when started on an LPAR is to establish or update a product registry and discover the mainframe environment (block 220). Next, at block 225 the Sysprog copies the run-time version of the deployment infrastructure to remote LPARs from the initial LPAR. This copy is not fully automated because the deployment infrastructure has not been fully established. At block 230, the Sysprog may start the deployment infrastructure on each of the remote LPARs established via block 225. Similarly to block 220, the deployment infrastructure establishes a product registry and discovers another portion of the mainframe environment at block 235. Finally, at block 240, the deployment infrastructure is in place and executing across the selected portion of the mainframe environment and automated product deployment may begin.

Figure 2B:
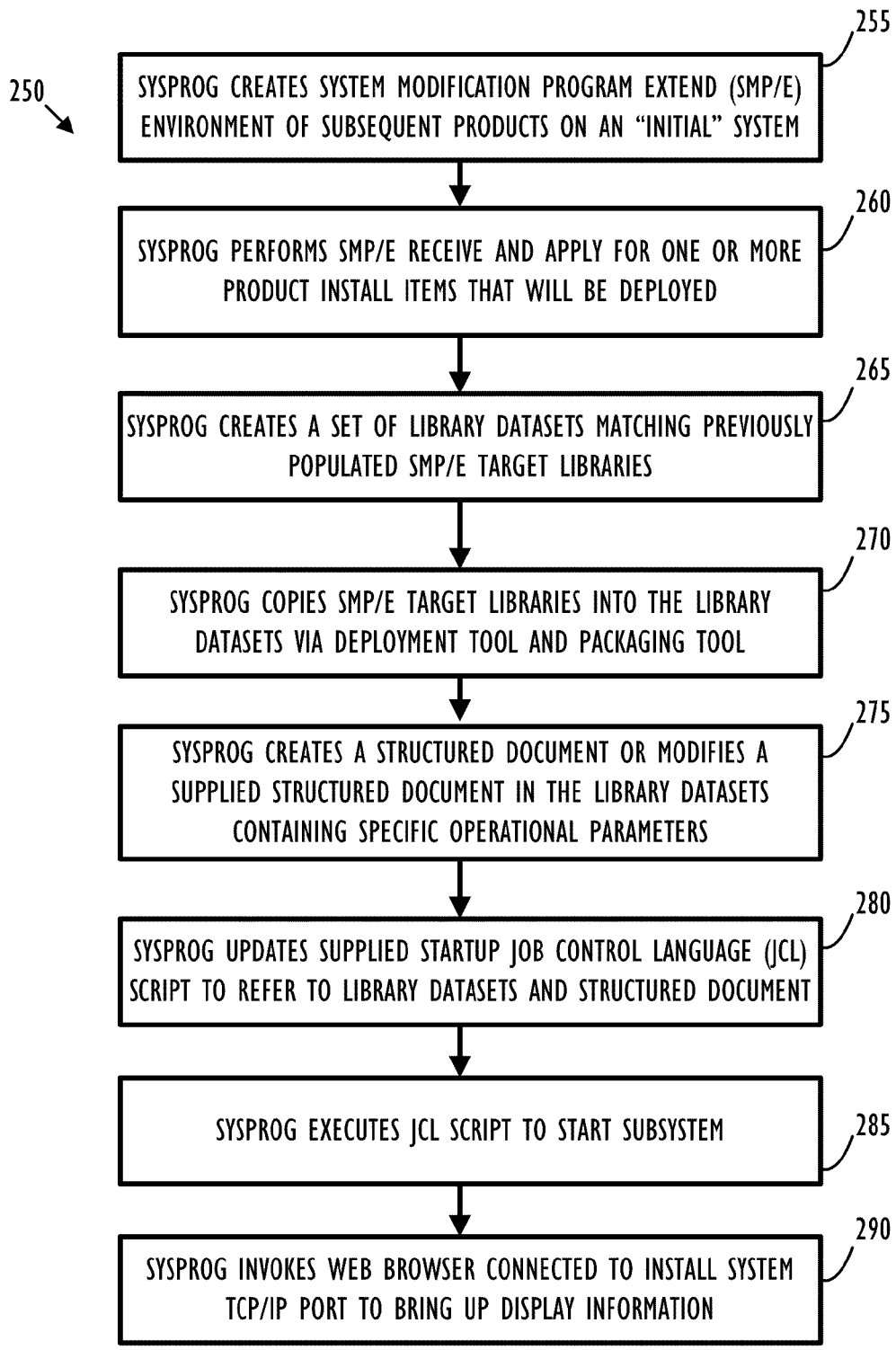

Referring now to FIG. 2B and process 250, products may be configured for automated deployment according to an embodiment of this disclosure. At block 255 a Sysprog creates an SMP/E install environment on an initial system. This initial system does not have to be the same initial system used to establish the deployment infrastructure described according to process 200. At block 260 the Sysprog issues SMP/E receive and apply commands for one or more installation items (e.g., combination of product and patch) for installation items which may later be deployed to a target system. When the SMP/E apply function is executed the product FMID or PTF is written to the SMP/E libraries. At block 265, the Sysprog creates a set of initial library datasets matching the previously populated SMP/E target libraries. Flow continues to block 270 where the Sysprog copies the SMP/E target libraries into the initial library datasets. At block 275 the Sysprog modifies a supplied structured document or creates a structured document (e.g., an eXtensible Markup Language XML document) containing parameter information such as high level qualifiers or other information which dictates specifics on how the product should operate. At block 280 the Sysprog updates any supplied startup JCL scripts to refer to the library datasets created at block 265 and the structured document created or modified at block 275. After the startup JCL has been modified it is executed at block 285 to initiate the subsystem. Finally, at block 290 the Sysprog invokes a web browser and connects to the initial system via a configured TCP/IP port to bring up current display information. If the initial system is a member of a Sysplex or has connectivity to other Sysplexes then all other LPARs in the environment may be shown. Further, all running subsystems (e.g., CICS, DB2, IMS) on the initial system may be shown. At the conclusion of process 200 the initial system is configured as a source of the installation item(s) for future deployment to other LPARs within the same mainframe environment and established with the deployment infrastructure.

Figure 3:
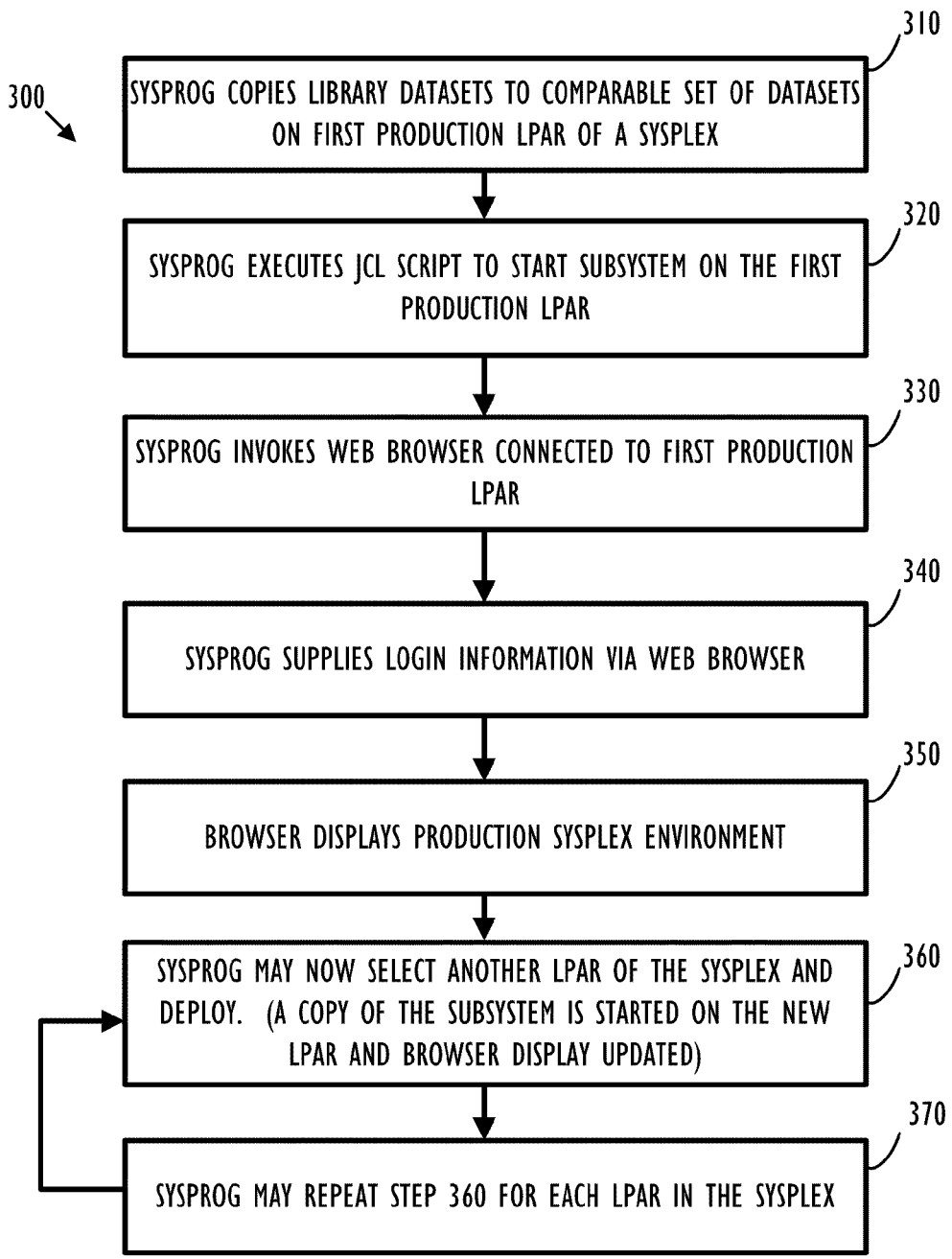
FIG. 3 shows, in flow chart form, an example workflow to prepare LPARs within a Sysplex for deployment according to one embodiment.

Referring now to FIG. 3, a process flow 300 to prepare LPARs within a Sysplex for deployment to production LPARs according to one embodiment is shown. Process 300 begins at block 310 where the Sysprog copies library datasets which have previously been set up via process 250 to a first production LPAR of a Sysplex. Block 310 must only be performed for the first LPAR of any production Sysplex. At block 320 the Sysprog starts the subsystem created via process 250 and may optionally execute an Installation Verification Program (IVP). At block 330, the Sysprog invokes a web browser and can connect to the first production LPAR. Next, at block 340, the Sysprog supplies appropriate login credentials for the LPAR to be used as the source for deployment via the connected web browser. After connecting, the browser may be refreshed to display the production Sysplex environment at block 350. Now that the Sysprog is connected to an established LPAR in the production Sysplex and the browser shows additional LPARs from the production Sysplex, the Sysprog may select one or more of the other LPARs and initiate a deploy to one or more of the additional LPARs at block 360. Block 360 also includes automatically starting a copy of the subsystem (and optionally running an IVP) after the Sysprog has initiated a deploy action from the first production LPAR and the transport has completed successfully. Finally, at block 370 the Sysprog may repeat the steps of block 360 for additional LPARs in the production Sysplex.

Figure 4:
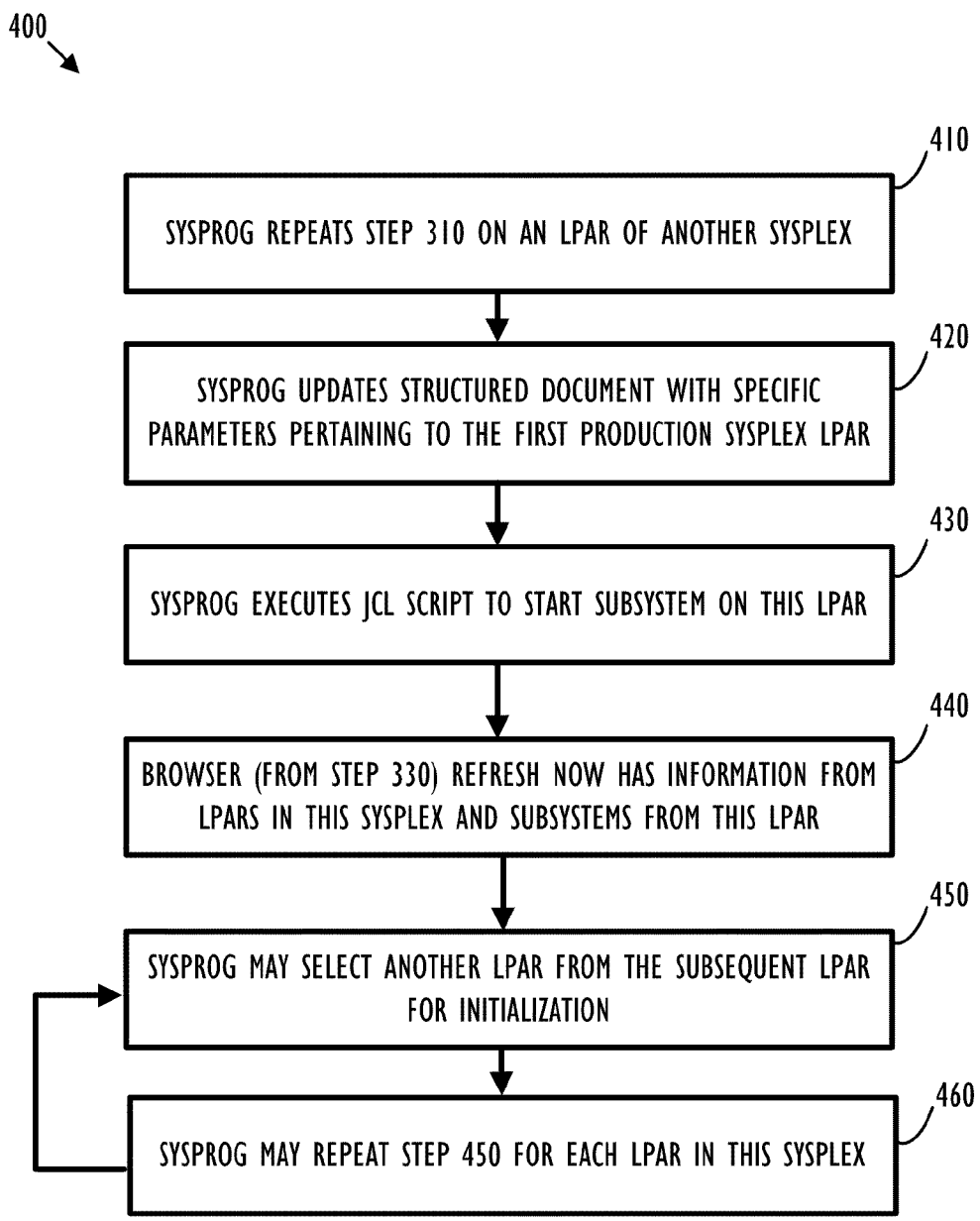
FIG. 4 shows, in flow chart form, an example workflow of subsequent Sysplex preparation for deployment according to one embodiment.

Referring now to FIG. 4, a process flow 400 to perform subsequent production Sysplex deployment within an established Sysplex according to one embodiment is shown. To initiate the subsequent product deployment (block 410), the Sysprog performs the acts of setting up a copy of library datasets as described for block 310. Next, at block 420, the Sysprog updates the structured configuration file to contain information to establish communication with the first production Sysplex (as configured via process 300). At block 430, the Sysprog executes the tailored startup JCL to start the subsystem on the selected LPAR of the subsequent production Sysplex. At block 440, the Sysprog may refresh the web browser opened at step 330. At this point, all LPARs in the subsequent production Sysplex are visible as well as all subsystems on the already initialized LPAR. At block 450, the Sysprog may repeat the acts of block 360 to initiate setup of additional LPARs in the subsequent production Sysplex. Finally, at block 460, the Sysprog may repeat the setup steps of block 450 for each additional LPAR within the subsequent production Sysplex.

Figure 5:
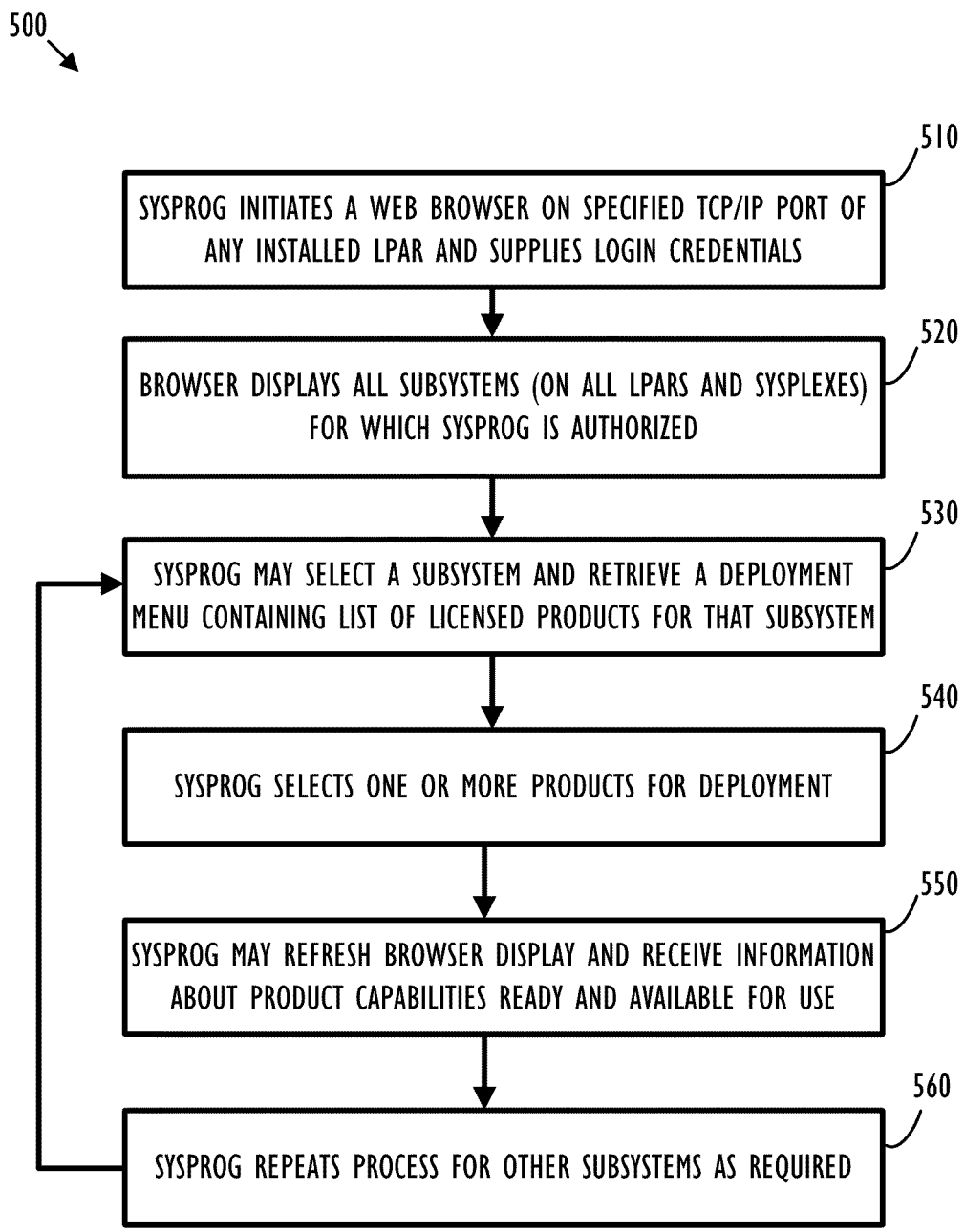
FIG. 5 shows, in flow chart form, an example workflow of ongoing product deployment (i.e., after completion of process 400) for products selected by a system administrator according to one embodiment.

Referring now to FIG. 5, a process flow 500 to perform subsequent product deployment within an established Sysplex, according to one embodiment, is shown. Process flow 500 begins at block 510 after a set of Sysplexes containing a set of LPARs has been established as described in process flow 200, 250, 300 and 400. A Sysprog may log into any LPAR that has been "established" within the Sysplexes via a web browser connecting to a specified TCP/IP port. Next, at block 520 the browser will display all subsystems on all LPARs and Sysplexes for which this particular Sysprog's credentials allow. At block 530 the Sysprog may select a subsystem on an LPAR and retrieve a menu containing a list of all licensed products for that subsystem. Next at block 540, the Sysprog may select one or more available products for deployment to another LPAR within the Sysplexes and select the target LPARs to receive the selected deployment. After the product is deployed to the other selected LPAR the Sysprog may initiate or receive a browser refresh (block 550) and the browser can display information about product capabilities ready and available for use on the target system. Finally, at block 560, the Sysprog may repeat the acts of product deployment as required for other LPARs and subsystems.

Figure 6:
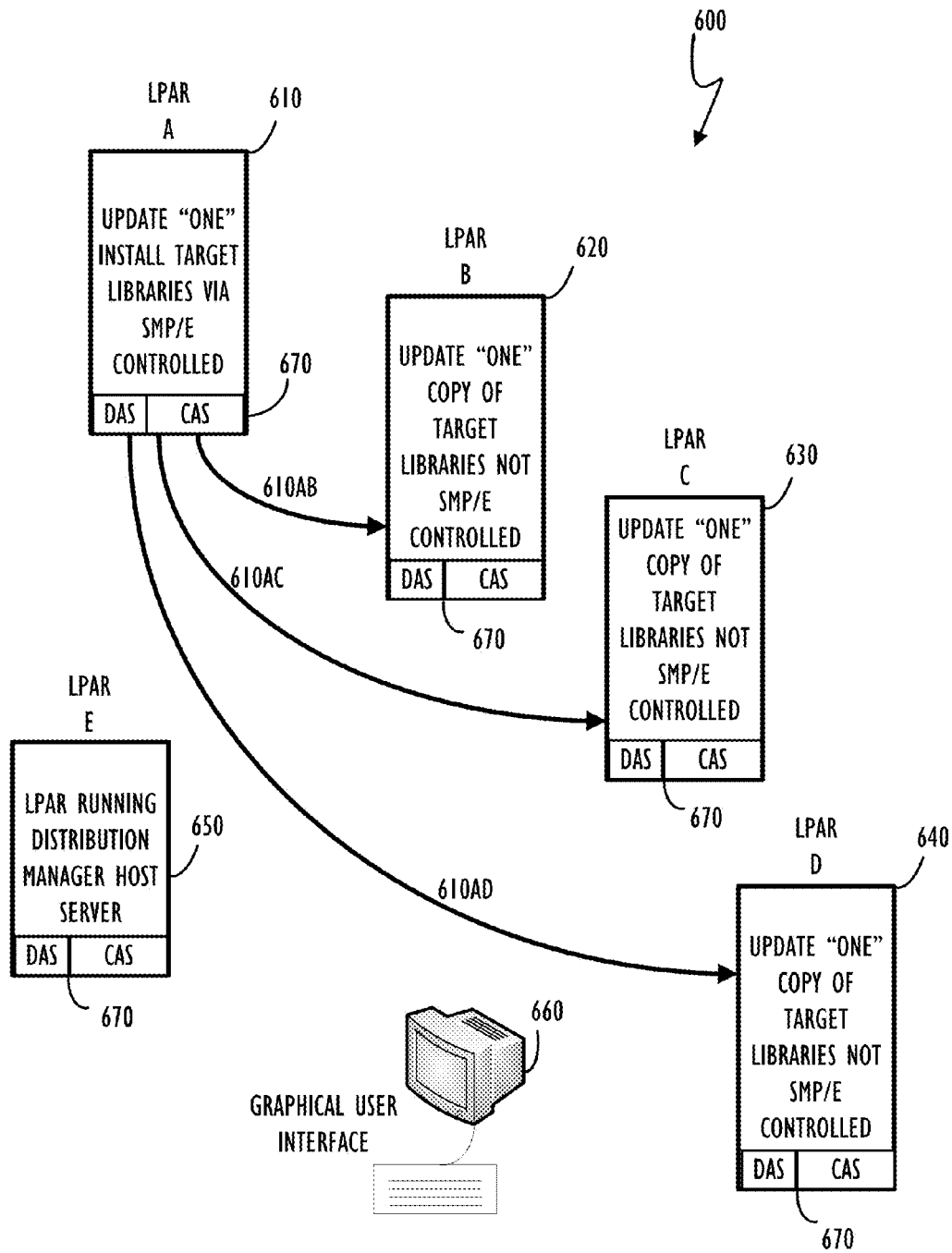
FIG. 6 shows, in block diagram form, an exemplary set of LPARs utilizing the workflow of FIGS. 2-5.

FIG. 6 illustrates block diagram 600 showing a similar mainframe environment to that described in FIG. 1, however, in this scenario each LPAR (610-650) contains deployment infrastructure including a deployment address space (DAS) and a coordinating address space (CAS) 670. The DAS/CAS 670 on each of LPARs 610-650 has been established via process flows 200, 300, and 400 described above. In this example, LPAR E 650 is running a distribution manager host server. A Sysprog may utilize graphical user interface (GUI) 660 to connect to the distribution manager host server via a TCP/IP port number. Product update "ONE" is a copy of the library datasets required for product update "ONE" on LPAR A 610. Product update "ONE" may consist of a new product, an upgrade to an already installed product, a patch/temporary fix, or even an update to a new maintenance level of product. In any case, once the initial copy of library data sets are made available on one LPAR of a group of communicatively coupled and "established" LPARs a Sysprog utilizing GUI 660 may select the update from the first LPAR (in this example LPAR A 610) and deploy that product update (e.g., update "ONE") to additional LPARs as represented by data flow arrows 610AB, 610AC and 610AD. Further, the acts of copying (610AB, 610AC and 610AD) may be performed independently and different levels of product updates may be installed on many combinations and permutations of LPARs without the system administrator having to actually log into any given LPAR.

Figure 7:
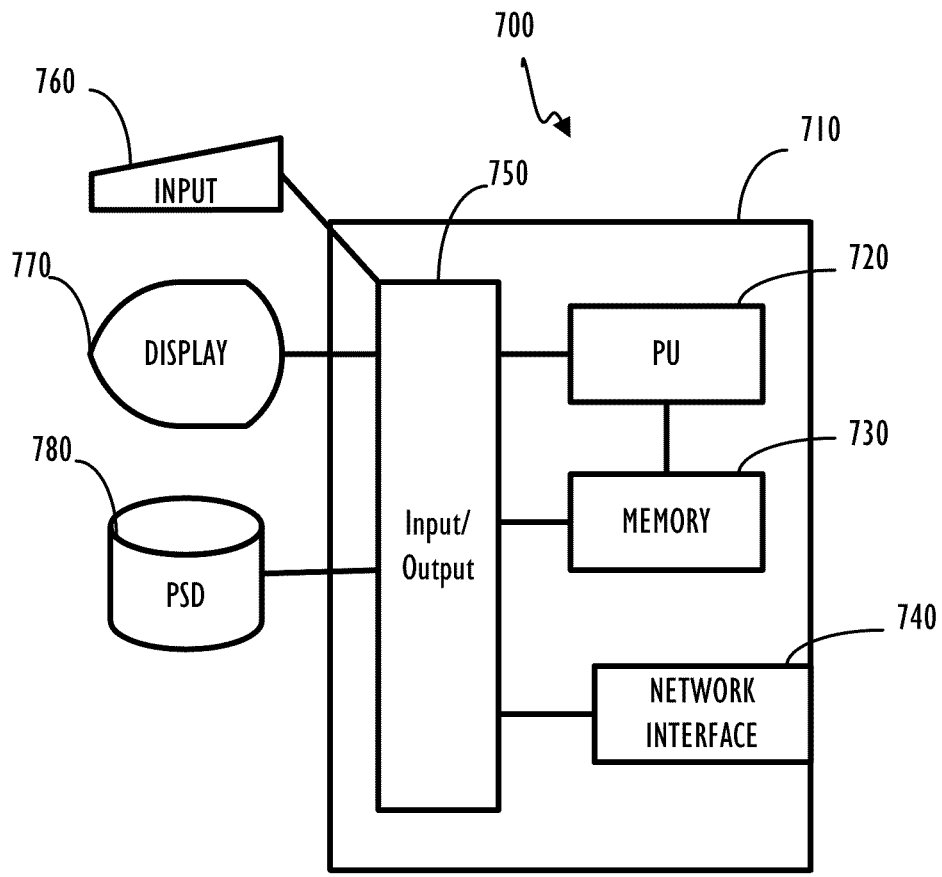
FIG. 7 shows, in block diagram form, an exemplary computing device comprised of a program control device.

Referring now to FIG. 7, an exemplary computing device 700 is shown. One or more exemplary computing devices 700 may be included in a mainframe computer (not shown). Exemplary computing device 700 comprises a programmable control device 710 which may be optionally connected to input 760 (e.g., keyboard, mouse, touch screen, etc.), display 770 or program storage device (PSD) 780 (sometimes referred to as a direct access storage device DASD). Also, included with program device 710 is a network interface 740 for communication via a network with other computing and corporate infrastructure devices (not shown). Note network interface 740 may be included within programmable control device 710 or be external to programmable control device 710. In either case, programmable control device 710 will be communicatively coupled to network interface 740. Also note, program storage unit 780 represents any form of non-volatile storage including, but not limited to, all forms of optical and magnetic storage elements including solid-state storage.

Program control device 710 may be included in a computing device and be programmed to perform methods in accordance with this disclosure (e.g., those illustrated in FIG. 2-5). Program control device 710 comprises a processor unit (PU) 720, input-output (I/O) interface 750 and memory 730. Processing unit 720 may include any programmable controller device including, for example, processors of an IBM mainframe (such as a quad-core z10 mainframe microprocessor). Alternatively, in non mainframe systems examples of processing unit 720 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 730 may include one or more memory modules and comprise random access memory (RAM), read only memory (ROM), programmable read only memory (PROM), programmable read-write memory, and solid state memory. One of ordinary skill in the art will also recognize that PU 720 may also include some internal memory including, for example, cache memory.

Figure 8:
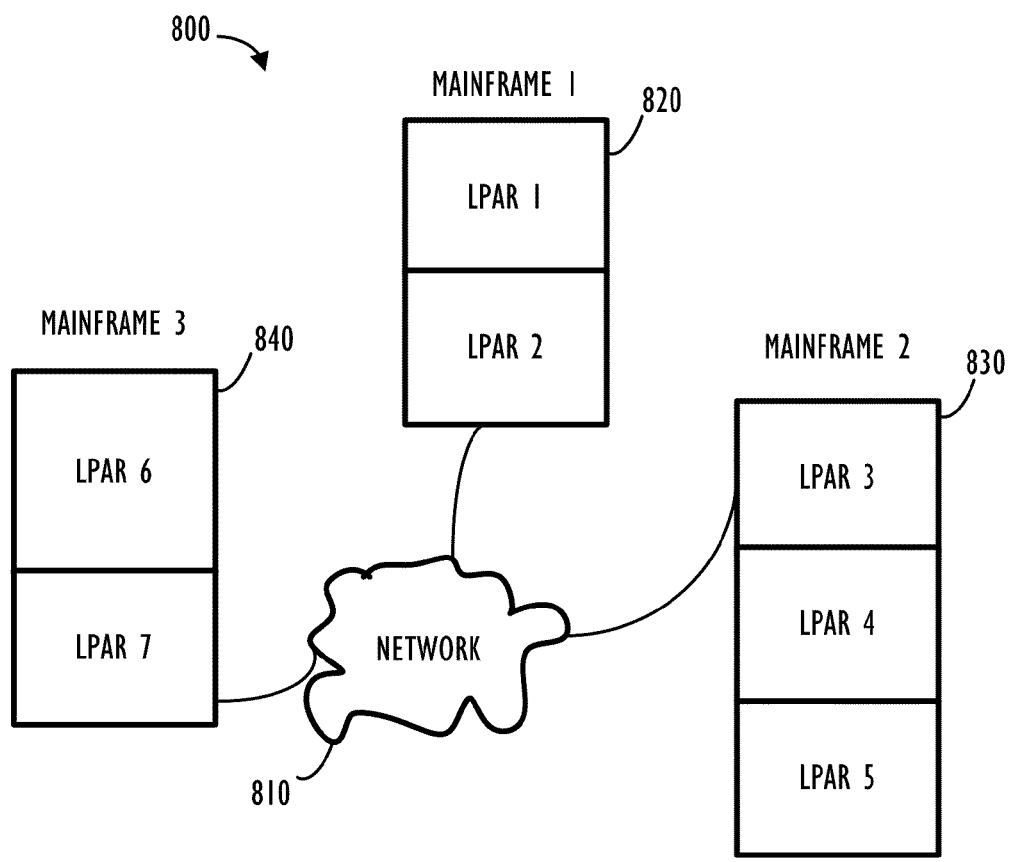
FIG. 8 shows, in block diagram form, an exemplary network of mainframe computers comprised of multiple Logical Partitions (LPARs).

Referring now to FIG. 8, a block diagram of a network multiple mainframe computers 800 is shown. Mainframe 1 (820) and mainframe 3 (840) each consist of two LPARs and mainframe 2 (830) consists of three LPARs. Each of these systems is connected via network 810 to each other and to other corporate infrastructure devices (not shown). Computer network 800 therefore depicts an example of seven LPARs (1-7). Also, each of these seven LPARs may correspond to LPARs A-D as shown in FIG. 1 (110, 120, 130, 140) and to LPARs A-E as shown in FIG. 6 (610, 620, 630, 640, 650) and benefit from the embodiments disclosed herein.

Aspects of the embodiments are described as a method of control or manipulation of data, and may be implemented in one or a combination of hardware, firmware, and software.

Embodiments may also be implemented as instructions stored on a machine-readable medium, which may be read and executed by at least one processor to perform the operations described herein. A machine-readable medium may include any mechanism for tangibly embodying information in a form readable by a machine (e.g., a computer), but excludes transitory propagating signals. For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps or process steps of FIGS. 2-5 may perform the identified steps in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIGS. 2-5 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes called computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices. Also, XML was discussed in the embodiments disclosed herein. However, those of ordinary skill in the art will recognize that control information may be maintained as structured text, binary object data (e.g., binary data structures), HTML or other forms of storing data.

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method of automating deployment of run-time software in a mainframe computing environment comprising one or more programmable control devices and a plurality of logical partitions (LPARs) communicatively coupled to each other, the method comprising:
   instantiating a deployment infrastructure that manages product inventory and distribution on a first logical partition (LPAR) of a first mainframe computer;
   installing a first copy of an installation item into a second LPAR;
   receiving instructions at a distribution manager process executing in a third LPAR that cause
   the distribution manager process to use the deployment infrastructure to deploy the installation item to the first LPAR utilizing installed content of the installation item in the second LPAR; and
   receiving an indication of a result status from the first LPAR wherein the result status provides an indication of success or failure relative to the deployment of the installation item on the first LPAR.

2. The method of claim 1 wherein the installation item comprises one of a complete product and a product upgrade.

3. The method of claim 1 wherein installing the first copy includes creating a set of initial library datasets and copying previously populated SMP/E libraries into the initial library datasets and deploying the installation item to the first LPAR is accomplished without SMP/E control.

4. The method of claim 1 wherein the installation item comprises one of a program temporary fix (PTF) and an authorized program analysis report (APAR).

5. The method of claim 1 wherein the deployment occurs without an administrator logging in to the first LPAR.

6. The method of claim 1 wherein the act of installing a first copy of the installation item is performed utilizing system modification program extend (SMP/E).

7. The method of claim 1 further comprising configuring the installation item on the second LPAR prior to deployment.

8. The method of claim 1 wherein the second LPAR is on a second mainframe computer.

9. A computer readable medium with instructions stored thereon for causing one or more programmable control devices to perform the method of claim 1.

10. A mainframe computing environment comprising a first Logical Partition (LPAR) of a first mainframe of a system complex (SYSPLEX) communicatively coupled to a distribution manager process (DMP) executing on a second LPAR of a second mainframe within the SYSPLEX wherein the first LPAR is configured to:
    receive instructions from the DMP to deploy one or more selected installed items on the first LPAR to
    a third LPAR within the SYSPLEX;
    establish a connection with the third LPAR; and
    transmit information associated with the one or more selected installed items to the third LPAR such that a copy of the one or more selected installed items is automatically installed on the third LPAR using a deployment manager address space that manages automatic installations on the third LPAR.

11. The mainframe computing environment of claim 10 wherein the first LPAR is further configured to provide an indication of success or failure relative to installation on the third LPAR to the DMP.

12. The mainframe computing environment of claim 10 wherein the third LPAR is configured to provide an indication of success or failure relative to installation on the third LPAR to the DMP.

13. The mainframe computing environment of claim 10 wherein the one or more selected installed items comprises a complete product.

14. The mainframe computing environment of claim 10 wherein the one or more selected installed items comprises a product upgrade.

15. The mainframe computing environment of claim 10 wherein the one or more selected installed items comprises a program temporary fix (PTF).

16. The mainframe computing environment of claim 10 where the first LPAR is further configured to create or update a product registry based on discovery of products installed on the first LPAR.

17. A mainframe computer communicatively coupled to one or more logical partitions (LPARs) in a mainframe computing environment and comprising a deployment manager process (DMP) wherein the DMP is configured to:
  receive instructions originating from a system administrator pertaining to one or more installed items on a first LPAR of a system complex (SYSPLEX);
  receive instructions pertaining to one or more second LPARs;
  establish a connection with the one or more second LPARs;
  automatically deploy the one or more installed items to the one or more second LPARs, each of the one or more second LPARs including a deployment manager address space that manages automatic installations on the respective LPAR;
  receive a result indicating success or failure of the deployment step from each of the one or more second LPARs; and
  provide an indication of the result to the system administrator.

18. The mainframe computer of claim 17 wherein the one or more installed items comprises a complete product.

19. The mainframe computer of claim 17 wherein the one or more installed items comprises a product upgrade.

20. A networked computer system comprising:
  a plurality of logical partitions (LPARs) existing on one or more communicatively coupled physical mainframe computers;
  a first LPAR comprising a system modification program extend (SMP/E) application;
  a second LPAR maintained exclusive of the SMP/E application; and
  a plurality of logical partitions communicatively coupled, at least one of the plurality of LPARs programmed to perform at least a portion of the method of claim 1 wherein the entire method of claim 1 is performed collectively by the plurality of LPARs.

\* \* \* \* \*

UNITED STATES PATENT AND TRADEMARK OFFICE
CERTIFICATE OF CORRECTION

| | | |
|---|---|---|
| PATENT NO. | : 8,464,246 B2 | Page 1 of 1 |
| APPLICATION NO. | : 12/614307 | |
| DATED | : June 11, 2013 | |
| INVENTOR(S) | : David Davies et al. | |

It is certified that error appears in the above-identified patent and that said Letters Patent is hereby corrected as shown below:

On the Title Page Item (56), under "OTHER PUBLICATIONS", in column 2, line 1, Delete "Users" and insert -- User's --, therefor.

Signed and Sealed this
Twenty-sixth Day of November, 2013

Margaret A. Focarino
*Commissioner for Patents of the United States Patent and Trademark Office*